United States Patent Office 3,544,636
Patented Dec. 1, 1970

3,544,636
PRODUCTION OF ALKYL-β-HYDROXYALKYL THIOETHERS AND ALKENYL-β-HYDROXY-ETHYL THIOETHERS
Harry Distler, 4 Alwin-Mittasch-Platz, and Gerhard Klatt, 11 Edenkobener Str., both of Ludwigshafen (Rhine), Germany, and Kurt Schneider, 25 Kropsburgstrasse, Limburgerhof, Pfalz, Germany
No Drawing. Filed Oct. 2, 1967, Ser. No. 671,974
Claims priority, application Germany, Oct. 7, 1966, 1,290,550; Dec. 9, 1966, 1,568,215
Int. Cl. C07c 149/18
U.S. Cl. 260—609    8 Claims

ABSTRACT OF THE DISCLOSURE

Production of alkyl- and alkenyl-β-hydroxyalkyl thioethers by reacting β-hydroxyethylmercaptan or β-hydroxypropylmercaptan with an alkyl or alkenyl halide in molar ratio at 40° to 110° C. in the presence of equivalent amounts of hydroxides of metals of Group I-A or II-A of the Periodic System, a tertiary amine or a quaternary ammonium base. The products are used for the manufacture of pest control agents.

---

This invention relates to a process for the production of alkyl-β-hydroxyalkyl thioethers or alkenyl-β-hydroxyalkyl thioethers from β-hydroxyalkylmercaptans.

It is known from Houben-Weyl, Methoden der Organischen Chemie, 9, 108 (1955), that methyl-β-hydroxyethyl thioether is obtained by reaction of β-chloroethanol with methylmercaptan in the presence of a base. It is also known from page 134 of the same reference that ethyl-β-hydroxyethyl thioether is obtained by reaction of ethylmercaptan with ethylene oxide. Both methods have the disadvantage that low boiling mercaptans have to be used and these have an extremely offensive odor even in small amounts. Moreover the said reactions give yields of only 80 and 70%, respectively.

It is an object of this invention to provide a process for the production of alkyl-β-hydroxyalkyl thioethers and alkenyl-β-hydroxyalkyl thioethers in which the starting materials are not low boiling point alkylmercaptans having an offensive odor. Another object of the invention is to provide a process in which alkyl-β-hydroxyalkyl thioethers and alkenyl-β-hydroxyalkyl thioethers are obtained in excellent yields.

In accordance with this invention these and other objects and advantages are achieved in a process for the production of alkyl-β-hydroxyalkyl thioethers and alkenyl-β-hydroxyalkyl thioethers in the presence of equivalent amounts of hydroxides of metals of Group I-A or II-A of the Periodic System, tertiary amines or quaternary ammonium bases by reacting β-hydroxyethylmercaptan or β-hydroxypropylmercaptan with an alkyl halide or an alkenyl halide having one to four carbon atoms in the molar ratio at temperatures of from 40° to 110° C.

We have now found that alkyl-β-hydroxyalkyl thioethers and alkenyl-β-hydroxyalkyl thioethers can be advantageously obtained in the presence of bases at elevated temperature by reacting β-hydroxyalkylmercaptans with alkyl halides or alkenyl halides.

The new process has the advantage that it is not necessary to start from low boiling alkylmercaptans having an offensive odor. Moreover the process gives excellent yields.

Preferred β-hydroxyalkylmercaptans have two or three carbon atoms. Suitable compounds are for example β-hydroxyethylmercaptan and β-hydroxypropylmercaptan.

The preferred alkyl halides having one to four carbon atoms or alkenyl halides having three or four carbon atoms are the corresponding chlorides, bromides or iodides. Particularly the corresponding alkyl chlorides are used because they are very easily accessible on a large scale. Examples of suitable compounds are: methyl chloride, methyl bromide, methyl iodide, isopropyl chloride, n-butyl bromide, 2-iodobutane, methallyl chloride, allyl bromide or allyl chloride. Ethyl halides, such as ethyl chloride, ethyl bromide or particularly ethyl iodide, are preferred.

It is advantageous to use the β-hydroxyalkylmercaptans and alkyl halides or alkenyl halides in equimolar proportions. It is also possible to use one or other component in an amount lower or higher than equimolar, for example by up to 10 mole percent.

The reaction is carried out in the presence of bases. It is preferred to use hydroxides of metals of Group I-A or II-A of the Periodic System, or also tertiary amines or quaternary ammonium bases. For example sodium hydroxide, potassium hydroxide, calcium hydroxide, barium hydroxide, triethylamine, pyridine, dimethylaniline and tetramethyl ammonium hydroxide are suitable. It is advantageous to use the bases in equivalent proportions.

The reaction proceeds in general at temperatures of 40° to 110° C. It is advantageous to use temperatures of 60° to 100° C.

The reaction may be carried out in the presence of solvents which are liquid under the reaction conditions, such as water or alcohols, for example methanol or ethanol. When water is used as the solvent, it is advantageous to use such an amount of water that the salts formed during the reaction remain in solution. It is advantageous for the reaction to be carried out in the presence, as a solvent of the alkyl-β-hydroxyalkyl thioether or alkenyl-β-hydroxyalkyl thioether to be expected as reaction product. Even small amounts, such as 0.1% by weight (with reference to the starting material) of alkyl-β-hydroxyalkyl thioether or alkenyl-β-hydroxyalkyl thioether are sufficient to start the reaction rapidly. It is advantageous to use 50 to 500% by weight (with reference to β-hydroxyalkylmercaptan used) of alkyl-β-hydroxyalkyl thioether or alkenyl-β-hydroxyalkyl thioether as solvent.

The process according to this invention may be carried out for example by placing β-hydroxyalkylmercaptan, with or without an addition of the alkyl-β-hydroxyalkyl thioether or alkenyl-β-hydroxyalkyl thioether expected as reaction product, in a stirred vessel, adding a base with or without adding the said solvent and then metering in the alkyl halides or alkenyl halide in the liquid state at the specified temperature. When the alkyl halide or alkenyl halide is gaseous, it can be metered in liquid under pressure or passed into the reaction mixture as a gas. The salt or aqueous salt solution is then separated by conventional methods, for example by decantation, and the organic phase is purified by distillation.

The alkyl-β-hydroxyalkyl thioethers and alkenyl-β-hydroxyalkyl thioethers prepared acrording to the invention are suitable for the production of pest control agents.

The invention is further illustrated by the following examples in which parts specified are parts by weight.

EXAMPLE 1

1200 parts of 50% by weight aqueous caustic soda solution is added to 500 parts of ethyl-β-hydroxyethyl thioether and 1239 parts of technical β-hydroxyethylmercaptan (content 94.5% by weight). At 80° C., 967 parts of chloroethane is passed in as a gas in the course of six hours. The reaction solution separates into an organic phase and a saturated solution of sodium chloride. After the organic phase has been separated it is distilled in vacuo. 2005 parts (yield 96% of the theory) of ethyl-β-hydroxyethyl thioether having a boiling point of 80° C. at 18 mm. and a refractive index $n_D^{20}=1.486$ is obtained as a colorless liquid.

EXAMPLE 2

480 parts of 50% by weight aqueous caustic soda solution is added to 500 parts of methyl-β-hydroxyethyl thioether and 468 parts of β-hydroxyethylmercaptan in a stirred vessel. 310 parts of chloromethane is then passed in at 80° to 100° C. in the course of five to six hours while stirring. When the reaction is over the reaction mixture has separated into an organic phase and an aqueous saturated solution of sodium chloride. The organic phase is separated and distilled in vacuo. 1028 parts (yield 95% of the theory) of methyl-β-hydroxyethyl thioether is obtained as a colorless liquid having a boiling point of 68° to 70° C. at 20 mm. and a refractive index $n_D^{30}=1.4867$.

We claim:

1. A process for the production of lower alkyl-β-hydroxyethyl or hydroxypropyl thioethers and lower alkenyl-β-hydroxyethyl or hydroxypropyl thioethers which comprises reacting a β-hydroxyethylmercaptan or a β-hydroxypropylmercaptan with an alkyl chloride, alkyl bromide, alkyl iodide, alkenyl chloride, alkenyl bromide or alkenyl iodide respectively having one to four carbon atoms in a substantially equal molar ratio in the presence of an equivalent amount of a hydroxide of a metal of Group I-A or II-A of the Periodic System, a tertiary amine or a quaternary ammonium hydroxide at a temperature of 40° to 110° C. in, as a solvent, 50 to 500% by weight, with respect to the mercaptan used in the reaction, of the lower alkyl-β-hydroxyethyl or hydroxypropyl thioether or the lower alkenyl-β-hydroxyethyl or hydroxypropyl thioether to be produced by said reaction.

2. A process as claimed in claim 1 in which an alkyl chloride, alkyl bromide or alkyl iodide respectively having 1-4 carbon atoms is used.

3. A process as claimed in claim 1 in which an alkyl chloride having one to four carbon atoms is used.

4. A process as claimed in claim 1 wherein the β-hydroxyalkylmercaptan is used in an excess of up to 10 mole percent.

5. A process as claimed in claim 1 wherein the alkyl or alkenyl chloride, bromide or iodide is used in an excess of up to 10 mole percent.

6. A process as claimed in claim 1 carried out at a temperature of from 60° to 100° C.

7. A process as claimed in claim 1, wherein said equivalent amount is an equivalent amount of concentrated aqueous caustic soda solution.

8. A process as claimed in claim 1, wherein the reaction mixture is formed by adding said mercaptan and said chloride, bromide or iodide to said solvent.

References Cited

Bergmann: J.A.C.S., vol. 74 (1952), pp. 828–829.
Reid: "Chemistry of Bivalent Sulfur," vol. II (1960), pp. 206–207.

CHARLES B. PARKER, Primary Examiner

D. R. PHILLIPS, Assistant Examiner

PO-1050
(5/69)

UNITED STATES PATENT OFFICE
CERTIFICATE OF CORRECTION

Patent No. 3,544,636          Dated December 1, 1970

Inventor(s) Harry Distler et al

It is certified that error appears in the above-identified patent and that said Letters Patent are hereby corrected as shown below:

Column 1, line 8, after "Germany" insert -- , assignors to Badische Anilin- & Soda-Fabrik Aktiengesellschaft, Ludwigshafen (Rhine), Germany --.

Column 2, line 34, "vent" should read -- vent, --.

SIGNED AND
SEALED
MAR 9 1971

(SEAL)
Attest:

Edward M. Fletcher, Jr.
Attesting Officer

WILLIAM E. SCHUYLER, JR
Commissioner of Patents